(12) United States Patent
Barat et al.

(10) Patent No.: US 12,511,597 B2
(45) Date of Patent: Dec. 30, 2025

(54) METHOD AND SYSTEM FOR DYNAMICALLY OPTIMIZING THE OPERATIONS OF LOGISTICS MANAGEMENT SYSTEM

(71) Applicant: Tata Consultancy Services Limited, Mumbai (IN)

(72) Inventors: Souvik Barat, Pune (IN); Vinay Kulkarni, Pune (IN); Subramaniam Dhandapani, Bangalore (IN); Prashant Kumar, Pune (IN); Solomon Pushparaj Manuelraj, Bangalore (IN); Sai Prasad Parmeswaran, Bangalore (IN); Monika Gajrani, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 770 days.

(21) Appl. No.: 17/699,259

(22) Filed: Mar. 21, 2022

(65) Prior Publication Data

US 2022/0343260 A1 Oct. 27, 2022

(30) Foreign Application Priority Data

Mar. 22, 2021 (IN) .............................. 202121012300

(51) Int. Cl.
*G06Q 10/0631* (2023.01)
*G06Q 10/08* (2024.01)

(52) U.S. Cl.
CPC ..... *G06Q 10/063118* (2013.01); *G06Q 10/08* (2013.01)

(58) Field of Classification Search
CPC ........... G06Q 10/063118; G06Q 10/08; G06Q 10/06393; G06Q 10/083; G06Q 10/06; G06Q 10/087
See application file for complete search history.

(56) References Cited

U.S. PATENT DOCUMENTS 10,810,534 B2 * 10/2020 Taylor .................. G06K 7/1413
2002/0179502 A1 * 12/2002 Cerutti .................. B65G 43/08
209/583

(Continued)

FOREIGN PATENT DOCUMENTS

EP        3 492 185 A1    6/2019

OTHER PUBLICATIONS

B. Korth, C. Schwede and M. Zajac, "Simulation-ready digital twin for realtime management of logistics systems," 2018 IEEE International Conference on Big Data (Big Data), Seattle, WA, USA, 2018, pp. 4194-4201, doi: 10.1109/BigData.2018.8622160. (Year: 2018).*

(Continued)

*Primary Examiner* — Scott L Jarrett
(74) *Attorney, Agent, or Firm* — FINNEGAN, HENDERSON, FARABOW, GARRETT & DUNNER LLP (57) ABSTRACT

This disclosure relates generally to the method and system for dynamically optimizing the operations of logistics management system. The existing methods for optimizing the operational processes in the sorting terminals are not dynamic as the sorting terminal operations are largely manual and experience driven. The proposed method and system describe an actor-based representation of simulatable digital twin of the sorting terminal that enables in-silico quantitative exploration of design space to help human experts arrive at the right decisions related to the logistics management system. The proposed method and system initially construct a high-fidelity simulatable digital twin of the sorting terminal, validate it, set it up with real data, and simulate various adaptation and design alternatives to understand their impacts on the key performance indicator values.

16 Claims, 7 Drawing Sheets

(56) References Cited

U.S. PATENT DOCUMENTS

| | | | | |
|---|---|---|---|---|
| 2011/0046775 | A1* | 2/2011 | Bailey | B07C 3/02 |
| | | | | 700/224 |
| 2017/0260008 | A1* | 9/2017 | DeWitt | B65G 1/0485 |
| 2018/0362258 | A1* | 12/2018 | Lykkegaard | B65G 23/44 |
| 2021/0109837 | A1* | 4/2021 | Rakshit | G06F 11/3476 |
| 2021/0138651 | A1* | 5/2021 | Mcgregor | G05B 19/41885 |

OTHER PUBLICATIONS

Borys, S.; Kaczmarek, W.; Laskowski, D. Selection and Optimization of the Parameters of the Robotized Packaging Process of One Type of Product. Sensors 2020, 20, 5378. https://doi.org/10.3390/s20185378 (Year: 2020).*

Kalusivalingam, Aravind K., A. Sharma, N. Patel, and V. Singh. "Enhancing Digital Twin Technology with Reinforcement Learning and Neural Network-Based Predictive Analytics." (2020). International Journal of AI and ML, 1(3). https://cognitivecomputingjournal.com/index.php/IJAIML-V1/article/view/51. (Year: 2020).*

Crainic et al., "Simulation of intermodal freight transportation systems: a taxonomy," European Journal of Operational Research, (2017).

Liedtke, "An Actor-based Approach to Commodity Transport Modelling," Conference on Applied Infrastructure Research (2006).

Pan et al., "Simulation Design of Express Sorting System—Example of SF's Sorting Center," Chemical Engineering Transactions, 51:457-462 (2016).

Yang et al., "Digital Twin-Driven Simulation for a Cyber-Physical System in Industry 4.0," DAAAM International Scientific Book, pp. 227-234 (2017).

* cited by examiner

METHOD AND SYSTEM FOR DYNAMICALLY OPTIMIZING THE OPERATIONS OF LOGISTICS MANAGEMENT SYSTEM

PRIORITY CLAIM

This U.S. patent application claims priority under 35 U.S.C. § 119 to: India Application No. 202121012300, filed on Mar. 22, 2021. The entire contents of the aforementioned application are incorporated herein by reference.

TECHNICAL FIELD

This disclosure relates generally to field of logistics, and more particularly to a method and system for transforming, optimizing and adapting operational processes in a logistics management system.

BACKGROUND

A sorting terminal of advanced postal and shipment companies is a sophisticated cyber physical system comprising of plurality of automated in feeds (to onboard parcels to be sorted), a sorting belt, a plurality of scanners (to scan the package), different kinds of chutes (to collect the sorted parcels), suitably skilled workforce (to empty the chutes and to move the packages to outfeed stations), and a set of outfeeds (to load the packages on trucks for dispatch). Further, for optimal utilization of the sorting terminal, the package should spend as less time on the sorting belt as possible, the chutes should be emptied as fast as possible, and there should be as few rejections (i.e., the cyber physical system could not perform the sorting task thus making it necessary for a human expert to complete the sorting process) as possible.

Some of the key operational challenges for the sorting terminal for a given (typically estimated) payload includes defining suitable configuration of sorting terminal (i.e., number and position of infeed, scanner, chutes, etc.), defining the sorting logic, assigning workforce to the chutes, in feeds and outfeeds and so on. Currently, the sorting terminal operations is largely static, and prediction driven. For instance, payload of a shift is estimated based on predicted payloads of the shift and the payload estimation is used to decide upon other parameters which includes historical occurrences, seasonality and experience. Further, the estimated payload needs to be accurate not only in terms of the quantum (i.e., number of packages) but also in terms of their sizes and destinations for the subsequent decisions to effective.

As future is rarely a linear extrapolation of the past, the payloads estimate is seldom inaccurate, thus requiring a plurality of interventions that put significant decision-making burden on the sorting terminal manager. Expertise is rare and even the best of managers is vulnerable to fatigue induced errors of commission and omission. As a result, sorting terminals end up operating at sub-optimal levels which introduces further sub-optimality's in the network. Moreover, there is no recourse available to test hypotheses, for instance, the sorting terminal manager may want to try out the possible interventions for an exceptional situation which needs to be done through a set of carefully designed experiments in real time including a time, effort, cost and an intellectual intensive endeavor. Further, these interventions should not compromise with the robustness of the sorting terminal operations. In other words, the sorting terminal manager would like to arrive at a set of policies from these set of tactics (i.e., interventions) to impart local optimality and global robustness.

SUMMARY

Embodiments of the present disclosure present technological improvements as solutions to one or more of the above-mentioned technical problems recognized by the inventors in conventional systems. For example, in one embodiment, a method for dynamically optimizing the operations of logistics management system is provided. The method comprises receiving, via one or more hardware processor, a plurality of data computed based on: historical data related to one or more parcels, data related to one or more sorting terminals, data related to one or more staff, and a plurality of parameters related to the one or more parcels from distributed sources with heterogeneous technology platforms, wherein the one or more parcels, the one or more sorting terminals, the one or more staff and the plurality of parameters are associated with the logistics management system; forecasting, via the one or more hardware processors, the plurality of data related to the one or more parcels based on the received plurality of data; Configuring, via the one or more hardware processor, the plurality of forecasted data related to the one or more parcels as a first set of entities; configuring, via the one or more hardware processors, each of the one or more sorting terminals as a second set of entities; configuring, via the one or more hardware processors, the data related to the one or more staff as a third set of entities; constructing, via the one or more hardware processors, a digital twin of the logistics management system using the second set of entities, the third set of entities and the plurality of parameters; providing, via the one or more hardware processors, a real time data related to the configured first, second and the third set of entities, as input to the constructed digital twin of the logistics management system to record a behavior of the configured first, second and the third set of entities; simulating, via the one or more hardware processors, the behavior of the configured first, second and the third set of entities for a plurality of scenarios; comparing, via the one or more hardware processors, the simulated behavior and the recorded behavior of the configured first, second and the third set of entities in terms of a set of key performance indicators; and providing, via the one or more hardware processors, a set of requirements to the logistics management system based on the comparison to optimize the operation of the one or more sorting terminals.

In another embodiment, there is provided a system for dynamically optimizing the operations of logistics management system. The system comprises: a memory storing instructions; one or more communication interfaces; and one or more hardware processors coupled to the memory via the one or more communication interfaces, wherein the one or more hardware processors are configured by the instructions to: receive, via the one or more hardware processor, a plurality of data computed based on: historical data related to one or more parcels, data related to one or more sorting terminals, data related to one or more staff, and a plurality of parameters related to the one or more parcels from distributed sources with heterogeneous technology platforms, wherein the one or more parcels, the one or more sorting terminals, the one or more staff and the plurality of parameters are associated with the logistics management system. The system further comprises forecasting, via the one or more hardware processor, the plurality of data related to the one or more parcels based on the received plurality of data. Configuring, via the one or more hardware processor, the plurality of forecasted data related to the one or more parcels as a first set of entities; configure, via the one or more hardware processor, each of the one or more sorting terminals as a second set of entities; configure, via the one or more hardware processor, the data related to the one or more staff as a third set of entities; construct, via the one or more hardware processor, a digital twin of the logistics management system using the second set of entities, the third set of entities and the plurality of parameters; provide, via the one or more hardware processor, a real time data related to the configured first, second and the third set of entities, as input to the constructed digital twin of the logistics management system to record a behavior of the configured first, second and the third set of entities; simulate, via the one or more hardware processor, the behavior of the configured first, second and the third set of entities for a plurality of scenarios; compare, via the one or more hardware processor, the simulated behavior and the recorded behavior of the configured first, second and the third set of entities in terms of a set of key performance indicators; and provide, via the one or more hardware processor, a set of requirements to the logistics management system based on the comparison to optimize the operation of the one or more sorting terminals.

In yet another embodiment, there are provided one or more non-transitory machine-readable information storage mediums comprising one or more instructions which when executed by one or more hardware processors cause receiving, via one or more hardware processor, a plurality of data computed based on: historical data related to one or more parcels, data related to one or more sorting terminals, data related to one or more staff, and a plurality of parameters related to the one or more parcels from distributed sources with heterogeneous technology platforms, wherein the one or more parcels, the one or more sorting terminals, the one or more staff and the plurality of parameters are associated with the logistics management system; forecasting, via the one or more hardware processors, the plurality of data related to the one or more parcels based on the received plurality of data; configuring the plurality of forecasted data related to the one or more parcels as a first set of entities; configuring, via the one or more hardware processors, each of the one or more sorting terminals as a second set of entities; configuring, via the one or more hardware processors, the data related to the one or more staff as a third set of entities; constructing, via the one or more hardware processors, a digital twin of the logistics management system using the second set of entities, the third set of entities and the plurality of parameters; providing, via the one or more hardware processors, a real time data related to the configured first, second and the third set of entities, as input to the constructed digital twin of the logistics management system to record a behavior of the configured first, second and the third set of entities; simulating, via the one or more hardware processors, the behavior of the configured first, second and the third set of entities for a plurality of scenarios; comparing, via the one or more hardware processors, the simulated behavior and the recorded behavior of the configured first, second and the third set of entities in terms of a set of key performance indicators; and providing, via the one or more hardware processors, a set of requirements to the logistics management system based on the comparison to optimize the operation of the one or more sorting terminals.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide the method and system for dynamically optimizing the operations in the logistics management system. The proposed method and system describe an actor-based representation of simulatable digital twin of the sorting terminal that enables in-silico quantitative exploration to understand the efficacy/utility of various adaptation and design alternatives toward optimizing logistics management system. The proposed method and system initially construct a high-fidelity simulatable digital twin of the sorting terminal, validate it, set it up with real data, and simulate various (hypothetical) adaptation and design alternatives to understand their impacts on the key performance indicator values (KPIs). The proposed method and system approach rests includes four important concepts which includes the digital twin to enable in-silico quantitative analysis, an actor-based modelling paradigm to represent individual characteristics of the logistics management as a system of systems as close to the reality as possible, a bottom-up simulation to quantitatively understand emergence behavior of the overall behavior of logistics management system that comprises multiple autonomous and interactive (sub) systems.

Referring now to the drawings, and more particularly to FIG. 1 through FIG. 5B, where similar reference characters denote corresponding features consistently throughout the figures, there are shown preferred embodiments and these embodiments are described in the context of the following exemplary system and/or method.

Figure 1:
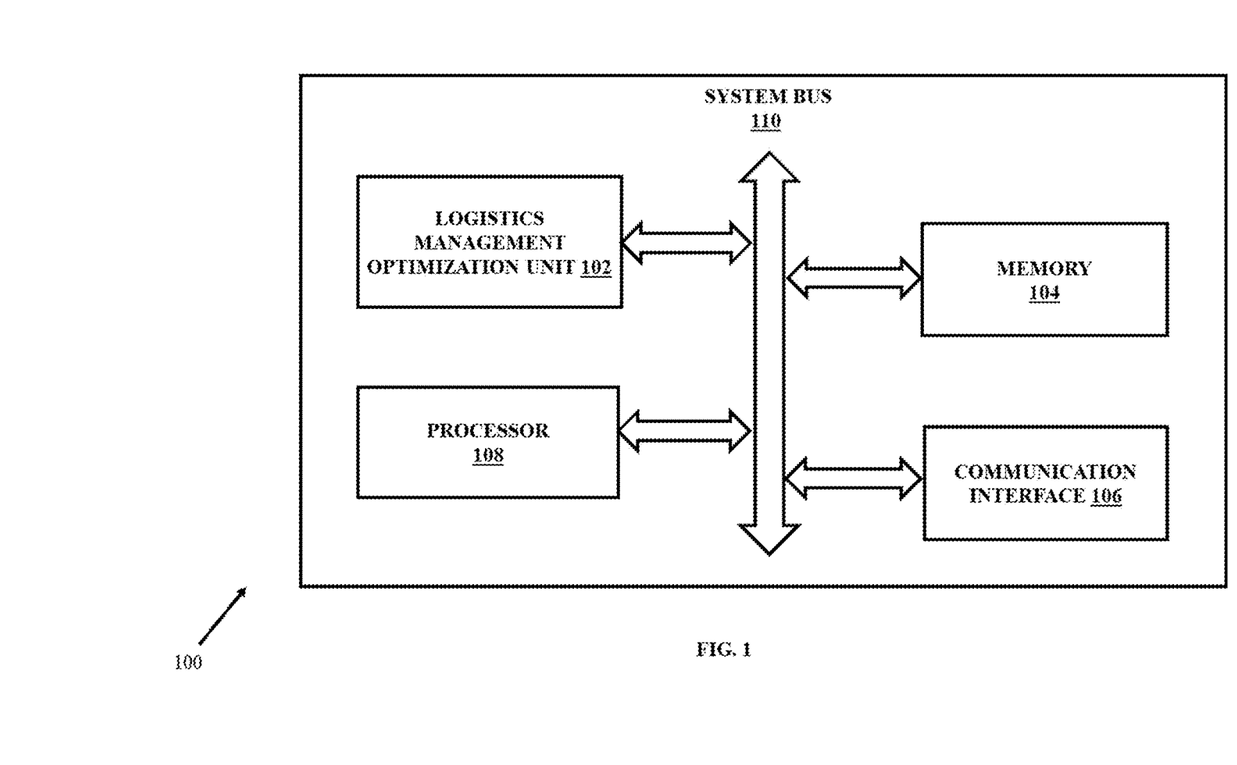
FIG. 1 shows a block diagram of a system for dynamically optimizing the operations of the logistics management system, according to an embodiment of the present disclosure.

FIG. 1 shows a block diagram of a system 100 for dynamically optimizing the operations of the logistics managements system, according to an embodiment of the present disclosure. The system 100 includes the logistics management optimization unit 102 for adaption and dynamic optimization of the operations of the logistics management system, in accordance with some embodiments of the present disclosure. The logistics management optimization unit 102 includes or is otherwise in communication with a memory 104, a communication interface 106, and a processor 108. The memory 104, communication interface 106, and the processor 108 may be coupled by a system bus 110 or a similar mechanism. Although FIG. 1 shows example components of the logistics management optimization unit 102, in other implementations, system 100 may contain fewer components, additional components, different components, or differently arranged components than depicted in FIG. 1.

The processor 108 may be implemented as one or more microprocessors, microcomputers, microcontrollers, digital signal processors, central processing units, state machines, logic circuitries, and/or any devices that facilitates in designing polymeric carrier for controlled release of molecules. Further, the processor 108 may comprise a multi-core architecture. Among other capabilities, the processor 108 is configured to fetch and execute computer-readable instructions or modules stored in the memory 104. The processor 108 may include circuitry implementing, among others, audio and logic functions associated with the communication. For example, the processor 108 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 108 thus may also include the functionality to encode messages and/or data or information. The processor 108 may include, among other things, a clock, an arithmetic logic unit (ALU) and logic gates configured to support operation of the processor 108. Further, the processor 108 may include functionality to execute one or more software programs, which may be stored in the memory 104 or otherwise accessible to the processor 108.

The memory 104, may store any number of pieces of information, and data, used by the system 100 to implement the functions of the system 100. The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Examples of volatile memory may include but are not limited to volatile random-access memory (RAM). The non-volatile memory may additionally or alternatively comprise an electrically erasable programmable read only memory (EEPROM), flash memory, hard drive, or the like. The memory 104 may be configured to store information, data, applications, instructions or the like for enabling the system 100 to carry out various functions in accordance with various example embodiments. Additionally, or alternatively, the memory 104 may be configured to store instructions which when executed by the processor 108 causes the system 100 to behave in a manner as described in various embodiments.

The communication interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the communication interface (s) 106 may include one or more ports. One or more functionalities of the system 100 and components thereof, is further explained in detail with respect to block diagram described in FIG. 2.

Figure 2:
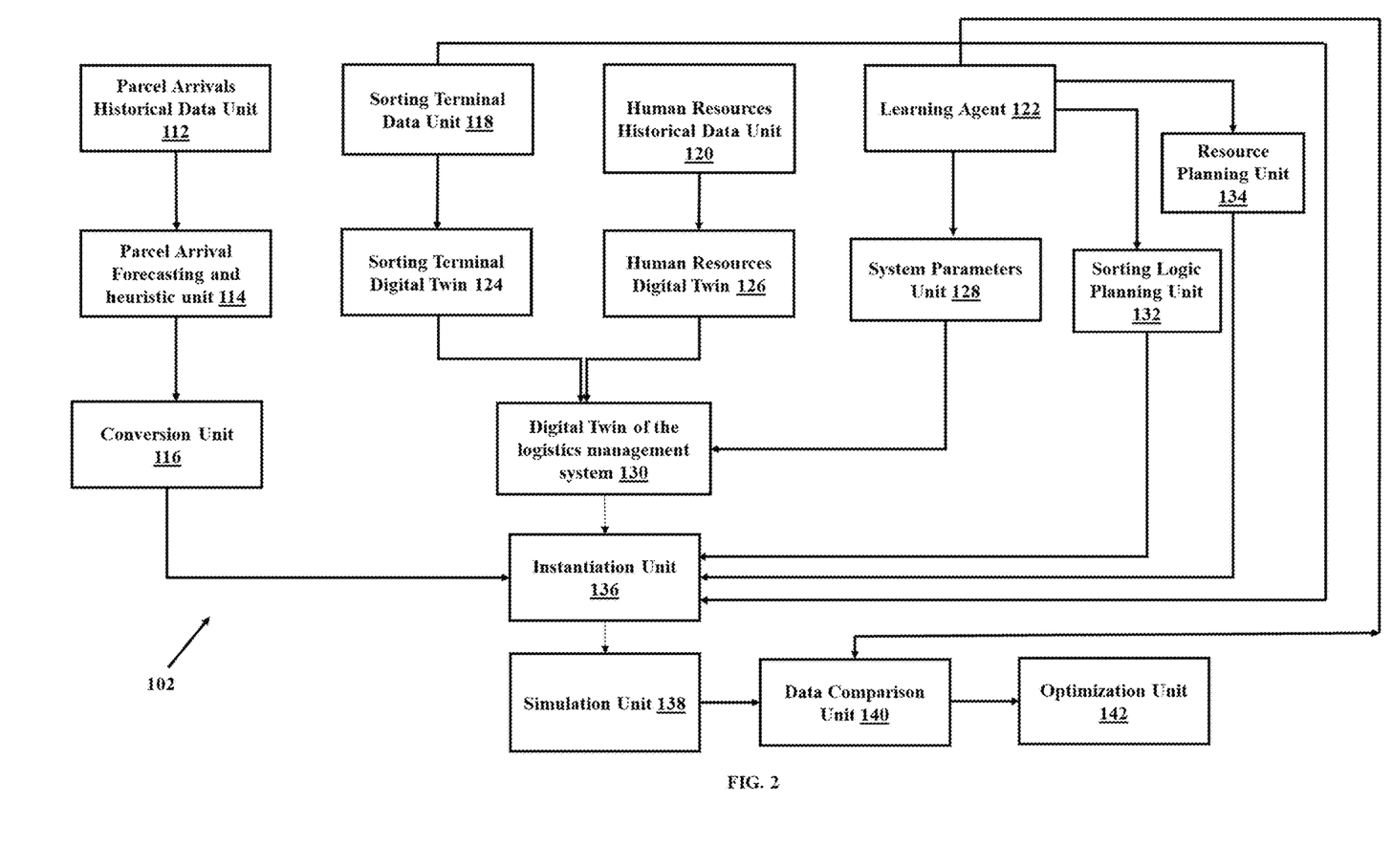
FIG. 2 is a functional block diagram of various modules stored in a logistics management optimization unit 102 of the system of FIG. 1 in accordance with some embodiments of the present disclosure.

FIG. 2, with reference to FIG. 1, is a functional block diagram of various modules stored in the logistics management optimization unit 102 of the system 100 of FIG. 1 in accordance with some embodiments of the present disclosure. In an embodiment of the present disclosure, the logistics management optimization unit 102 comprises of various modules that include a parcel arrivals historical data unit 112, a parcel arrival forecasting and heuristic unit 114, a conversion unit 116, a sorting terminal data unit 118, a human resources historical data unit 120, a learning agent 122, a sorting terminal digital twin 124, a human resources digital twin 126, a digital twin of the logistics management system 130, an instantiation unit 136, a simulation unit 138, a data comparison unit 140 and an optimization unit 142. Further, learning agent 122 includes a system parameters unit 128, a sorting logic planning unit 132 and a resource planning unit 134.

In an embodiment, the sorting terminal data unit 118 and the human resources historical data unit 120 of the logistics management optimization unit 102 assist to construct the sorting terminal digital twin 124 and the human resources digital twin 126 respectively. Further, the sorting terminal digital twin 124, the human resources digital twin 126 along with the system parameters unit 128 which is derived from the learning agent 122 of the logistics management optimization unit 102 assist to construct the digital twin of the logistics management system 130. Further the current constructed set up is instantiated, simulated and observed through the digital twin unit of the logistics management system 130, instantiation unit 136 and the simulation unit 138 of the logistics management optimization unit 102 respectively and the observed simulation result (data) should be stored in the data comparison unit 140 of the logistics management optimization unit 102.

According to an embodiment of the disclosure, the parcel arrivals historical data unit 112 of the logistics management optimization unit 102 of the system of FIG. 1 is configured to receive a plurality of historical data related to one or more digital form of parcels from distributed sources with heterogeneous technology platforms wherein the one or more parcels are associated with the logistics organization. The heterogenous technology platforms may include database, distributed computing machines which may further include a machine learning agent, a reinforcement learning agent and an optimizer. A plurality of forecasting data is computed based on the plurality of historical data related to one or more parcels received from the parcel arrivals historical data unit 112. In the conversion unit 116 of the logistics management optimization unit 102 the plurality of forecasted data related to one or more digital form of parcels is configured/constructed as a first set of entities.

In an embodiment, the sorting terminal data unit 118 of the logistics management optimization unit 102 of the system of FIG. 1 is configured to receive a plurality of data related to the one or more sorting terminals from distributed sources with heterogeneous technology platforms wherein the one or more sorting terminals are associated with the logistics management system. The sorting terminal of the advanced postal and shipment companies is a sophisticated cyber physical system comprising of automated in feeds (to onboard parcels to be sorted), the one or more sorting belts, the one or more scanners (to scan the package), the plurality of chutes (to collect the sorted parcels), suitably skilled workforce (to empty the chutes and to move the packages to outfeed stations) i.e., the plurality of human resources and a set of outfeeds (to load the packages on trucks for dispatch). In an embodiment, the human resources historical data unit 120 of the logistics management optimization unit 102 of the system of FIG. 1 is configured to receive a plurality of historical data related to a one or more staffs from distributed sources with heterogeneous technology platforms wherein the one or more staffs are associated with the logistics management system. The data related to the one or more staff (i.e., digital form/representation) may include staff characteristics which is represented in terms of productivity and availability. In the present disclosure, emotional and fatigue aspects of the staff are not considered in the digital representation. In an embodiment, the learning agent 122 of the logistics management optimization unit 102 is configured to capture a plurality of learnings obtained through the simulation of the constructed digital twin of the logistics management system 130 wherein the results of the simulation unit 138 is stored in the data comparison unit 140. The learning agent 122 learns continuously from the historical data and real data of the configured entities (i.e., first set of entities and second set of entities).

In an embodiment of the present disclosure, the system parameters unit 128 comprises the plurality of system parameters which includes a re-circulation count, the number of chutes and the corresponding location of the chutes. The plurality of parameters is derived from the learning agent 122 of the logistics management optimization unit 102 which learns continuously from the historical data and real data of the configured entities (i.e., first set of entities and second set of entities). Further as mentioned in the previous sections, the plurality of parameters comprised in the system parameters unit 128 assist in the construction of the digital twin of the logistics management system 130 of the logistics management optimization unit 102 of the system of FIG. 1. The sorting logic planning unit 132 which is derived from the learning agent 122 of the logistics management optimization unit 102 includes the sorting logic required for the optimization of the logistics management system and the resource planning unit 134 which is also derived from the learning agent 122 of the logistics management optimization unit 102 includes the characteristics and the real time data related to the staff.

According to an embodiment of the disclosure, the instantiation unit 136 of the logistics management optimization unit 102 of the system 100 of FIG. 1 is configured to instantiate the constructed digital twin of the logistics management system 130 with real data from the past i.e., inputs and events in order to produce output that matches the past output. The real time data related to the configured first, second and the third set of entities is provided as input to the constructed digital twin of the logistics management system 130 to record the behavior of the configured first, second and the third set of entities. Further, the real time data to the constructed digital twin of the logistics management system 130 includes providing data related to the staff and the sorting logic which may further include a massively distributed heterogeneous IoT (Internet of things) devices and sensors. The simulation unit 138 of the logistics management optimization unit 102 of the system 100 is configured to simulate the behavior of the configured entities (i.e., first set of entities, second set of entities and third set of entities) for a plurality of scenarios by virtually introducing specific time 'tick' or time unit, such as minutes, hours and day. The plurality of scenarios may include a scenario specific to a change in the behavior of the configured entities (i.e., first set of entities, second set of entities and third set of entities), a scenario wherein the quantity of parcels serviced is more compared to the normal parcel processing, a scenario specific to a change/variation in the staff availability (For e.g., can be read from an attendance database or the sensing devices) and a scenario specific to a change in the chute availability and working (For e.g., collected from the sensing devices) over forward looking virtual time such as next hours, days or months.

In an embodiment, the data comparison unit 140 of the logistics management optimization unit 102 of the system 100 of FIG. 1 is configured to compare the simulated behavior and the recorded behavior of the configured first, second and the third set of entities by comparing a set of key performance indicators collected from different scenario simulations. The set of key performance indicators may include productivity of the staff, turn-around time of the one or more parcels and capacity which is represented in terms of one or more parcels serviced, wherein the turn-around time represents time period taken by the parcels during in-feed and out-feed. The optimization unit 142 of the logistics management optimization unit 102 of the system 100 is configured to optimize the operation of the one or more sorting terminals by providing a set of requirements for the logistics management system based on the comparison performed by the data comparison unit 140. The set of requirements for the logistics management system may include increasing throughput, increasing staff utilization, increasing utilization of all configured entities (i.e., the first, second and the third set of entities) which are related to the one or more sorting terminal.

The proposed method and system propose a hi-fidelity representation of the sorting terminal in terms of a simulatable model i.e., the digital twin wherein, the digital twin is validated for correctness using past data. The digital twin of sorting terminal helps in identifying the desired set of localized interventions (e.g., the plurality of scenarios) for exception situations. It is important to note that an exception situation may have multiple candidate interventions. Further, a right intervention needs to be introduced with respect to the current state of the sorting terminal, to meet the desired goal in an appropriate manner. The present disclosure use reinforcement learning technique to achieve desired results from the set of possible interventions. In other words, the reinforcement learning agent imparts continual adaptiveness to the sorting terminal. The key advantage being, this learning is obtained "in silico" using hi-fidelity representation of the sorting terminal and real data. The present disclosure had developed an architecture to integrate the digital twin and reinforcement learning agent to impart continuous dynamic adaptation to the sorting terminal even in the face of partial knowledge due to inherent uncertainty. Thus, the proposed approach and associated technology infrastructure provide adequate support for analysis (i.e. why sorting terminal is operating the way it is and devise suitable interventions to overcome point problems), control (i.e. apply appropriate intervention in response to the change in environment), adaptation (i.e. learn a policy comprising of situation specific point interventions to meet (possibly) new goals, and design (i.e. what's the right sorting terminal configuration that best meets given operational needs of a sorting terminal).

In an embodiment, the present disclosure has developed an actor-based language called ESL (Enterprise Specification Language—known in the art) to specify digital twin of a complex system (e.g., logistics management system) wherein the one or more parcels (114), the one or more sorting terminals (124), the one or more staff (126), and the learning agent (122) are represented as "actor". Further the actor-based language helps to capture system as a set of intentional (i.e., there is a well-defined goal to be achieved) autonomous (i.e., capability to achieve the goal in a proactive manner) composable (i.e., an actor can be realized in terms of a set of fine-grained interacting actors) actors. In an embodiment of the present disclosure, the word "actors" refers to the first, second and third set of entities. In practice, an actor (e.g., first set of entities) tries to achieve its stated goal by responding suitably to the events of interest and by exchanging messages with other actors ((e.g., second and third set of entities). Further, an actor behavior is stochastic i.e., there could be a probability distribution of actions associated with an event (e.g., arrival time of the parcels, parcel size & weights, and productivity of the staffs). The present disclosure constitutes the necessary and required technology infrastructure to enable continuous data-driven justification-backed dynamically adaptive sorting terminal.

Figure 3A:
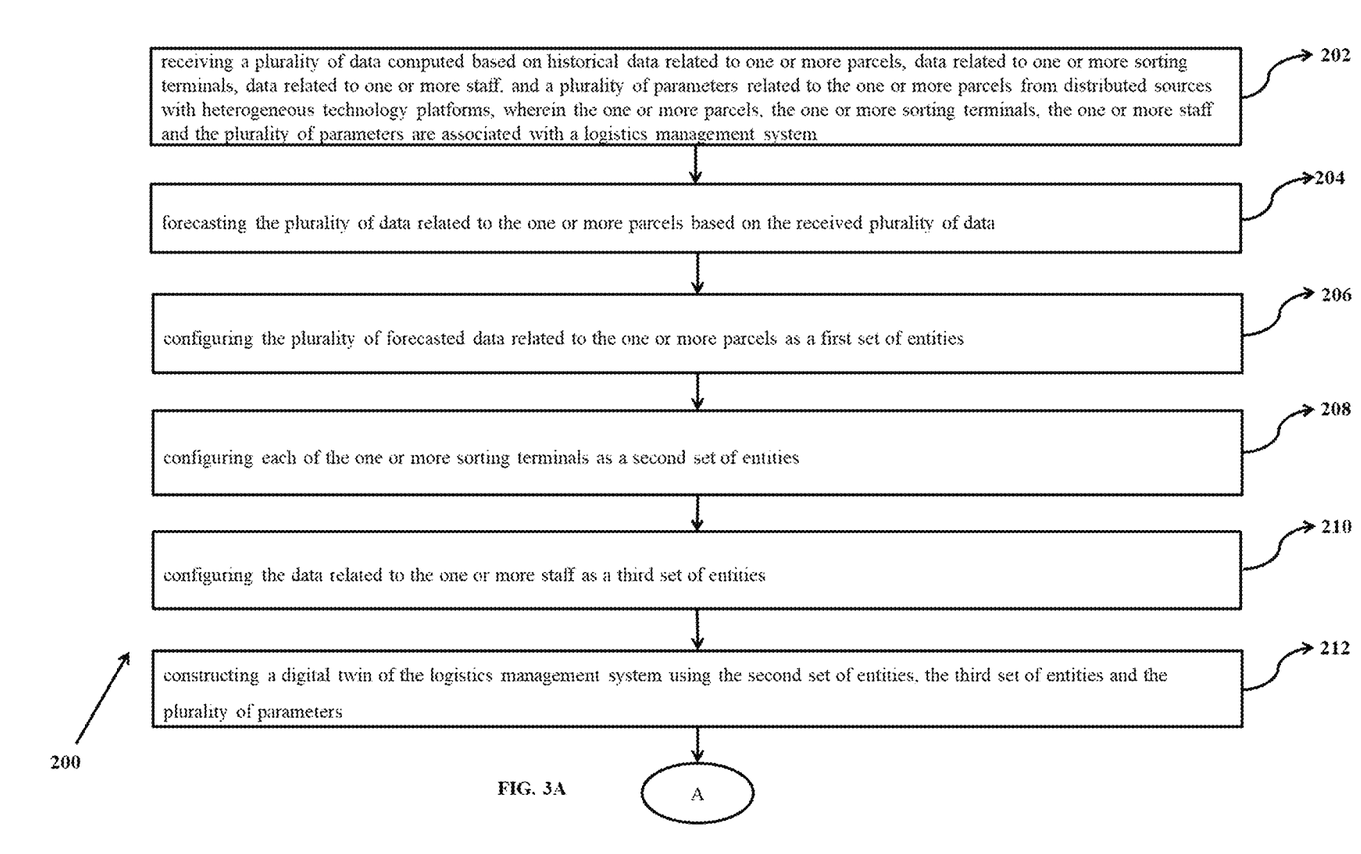
FIGS. 3A and 3B shows a flowchart illustrating the steps involved in a method for dynamically optimizing the operations of the logistics management system, according to an embodiment of the present disclosure.
Figure 3B:
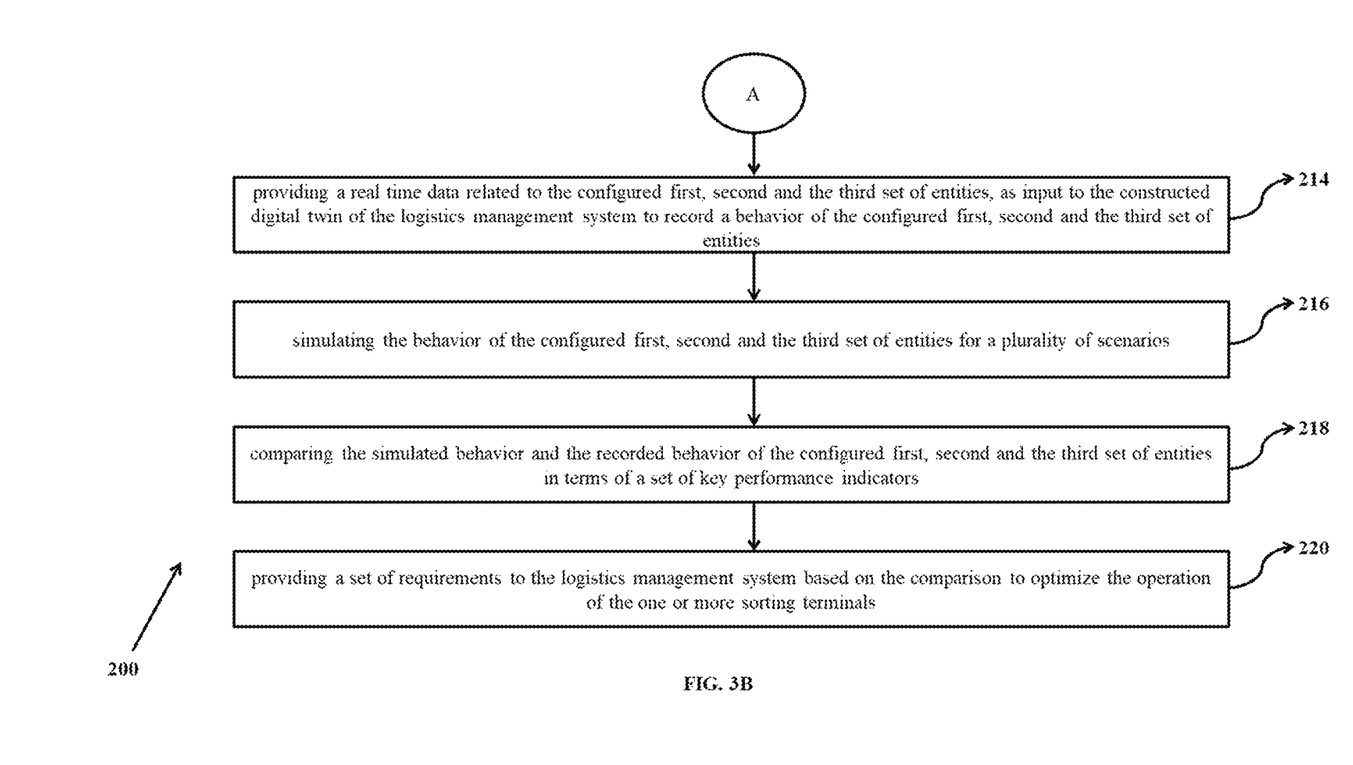

FIGS. 3A and 3B, with reference to FIGS. 1-2, shows a flowchart 200 illustrating the steps involved in a method for dynamically optimizing the operations of the logistics management system using the system 100 of FIG. 1 according to an embodiment of the present disclosure. In an embodiment, the system 100 comprises one or more data storage devices or the memory 104 operatively coupled to the one or more processors 108 and is configured to store instructions for execution of steps of the method by the logistics management optimization unit 102. The steps of the method of the present disclosure will now be explained with reference to the components of the system 100 and the modules 202-220 as depicted in FIGS. 1-2, and the flow diagram as depicted in FIGS. 3A and 3B.

Initially at step 202 of the method 200, the one or more hardware processors 108 receive a plurality of data based on historical data related to one or more parcels, data related to one or more sorting terminals, data related to one or more staffs, and a plurality of parameters related to the one or more parcel, wherein the one or more parcels, the one or more sorting terminals, the one or more staff and the plurality of parameters are associated with the logistics management system. At step 204 of the method 200, the one or more hardware processors 108, forecast the plurality of data related to the one or more parcels based on the received plurality of data. At step 206 of the method 200, configure the plurality of forecasted data related to the one or more parcels as a first set of entities. At step 208 of the method 200, the one or more hardware processors 108, configure each of the one or more sorting terminals as a second set of entities. At step 210 of the method 200, the one or more hardware processors 108, configure the data related to the one or more staff as a third set of entities.

At step 212 of the present disclosure, the one or more hardware processors 108 construct a digital twin of the logistics management system using the second set of entities, the third set of entities and the plurality of parameters. At step 214 of the method 200, the one or more hardware processors 108, provide a real time data related to the configured first, second and the third set of entities, as input to the constructed digital twin of the logistics management system to record a behavior of the configured first, second and the third set of entities. At step 216 of the method 200, the one or more hardware processors 108, simulate the behavior of the configured first, second and the third set of entities for a plurality of scenarios. At step 218 of the method 200, the one or more hardware processors 108 compare the simulated behavior and the recorded behavior of the configured first, second and the third set of entities in terms of a set of key performance indicators. Finally, at step 220 of the method 200, the one or more hardware processors 108, provide a set of requirements to the logistics management system based on the comparison to optimize the operation of the one or more sorting terminals.

The foregoing tables from table 1 to table 6 depicts the examples of the terminal layout configuration, sorting logic, staff configuration, chute configuration, cage configuration, truck configuration illustrating the dynamically optimization of the operations of the logistics management system, according to an embodiment of the present disclosure.

TABLE 1

Terminal Layout Configuration
Terminal Layout Configuration

| Key | Value | Details |
|---|---|---|
| No Of Slots | 522 | Slots in a conveyor belt |
| No Of Infeeds | 6 | |
| No Of Zones | 4 | |
| Zone Names | Red, Blue, White, Yellow | |
| Infeed Location Zone Wise | [ ], [145, 150, 155], [ ], [300, 305, 310] | Define feed position |
| Chutes Location Zone Wise | [20, 30, 45, 60, 65], [105, 110, 115, 125], [180, 190, 210, 220, 230], [260, 270, 280, 290] | Define chute positions - DIRECT = 4, SPIRAL = 8, BOOM_CONVEYOR = 4, REJECTED = 2 |
| Chutes Type Zone Wise | [0, 1, 1, 0], [0, 3, 0], [1], [2, 2, 3] | Define Chute Types: DIRECT = 0; SPIRAL = 1; BOOM_CONVEYOR = 2; REJECTED = 3 |
| Scanners | [ ], [140], [ ], [295] | Define Scanner locations |
| Length Of Slot | 1.5 | |
| Width Of Slot | 3.5 | |
| Distance In Between Slots | 0.5 | |
| Distance Per Minute | 120 | Belt Speed |
| Max No Of Re-circulations Allowed | 3 | |
| Max Parcels Per Tick Per Infeed | 40 | (In case required) |

TABLE 2

Sorting Logic

| Location | Weight | Chutes |
|---|---|---|
| 0-10000 | 0-1000 | 3 |
| 0-10000 | 1001-5000 | 2, 4, 7, 8, 10, 13, 15, 17 |
| 10001-50000000 | 0-1000 | 5, 9 |
| 10001-10000000 | 1001-5000 | 14 |
| 0-200000000 | 5001-1000000 | 18 |
| * | * | 18 |

TABLE 3

Resource Configuration

| Resource Configuration | | |
|---|---|---|
| Resource allocation per Zone | 3, 3, 3, 4 | |
| No. of parcels can be picked up by a Resource in an hour | 120 | |

Resource Productivity

| | Minimum Value | Maximum Value |
|---|---|---|
| Resource productivity Range | 0.3 | 1.1 |

TABLE 4

Chute Configuration

| Chute | No. of Cages | Width | Height |
|---|---|---|---|
| Direct Chute | 10 | NA | NA |
| Spiral Chute | 10 | 1000 | 10000 |
| Boom Conveyor | NA | NA | NA |

TABLE 5

Cage Configuration

| Cage length (in mm) | 1150 |
|---|---|
| Cage width (in mm) | 700 |
| Cage height (in mm) | 1500 |

TABLE 6

Truck Configuration

| Truck Width (in mm) | 3000 |
|---|---|
| Truck Height (in mm) | 2000 |
| Truck Length (in mm) | 3000 |

The table 7 and table 8 depicts a use case illustrating the sorting logic for re-circulation of total number of parcels (system parameter—box 126) and sorting time when the location of more utilized chute is replaced with less utilized chute placed near OCR (i.e., Optical Character Reader, for e.g., scanner). An average sorting time which is represented in minutes (in terms of simulation 'tick') before replacing the more utilized chute with less utilized chute is depicted in table 7 and the average sorting time after replacing the more utilized chute with less utilized chute is depicted in table 8. It is observed from the table 7 and table 8 that, there is a reduction in the average sorting time after replacing the more utilized chute with less utilized chute, thereby illustrating the dynamic optimization of the operations of the logistics management system (e.g., the sorting terminal).

TABLE 7

Average sorting time before replacing the more utilized chute with less utilized chute.

| KPI's | Values |
|---|---|
| Total number of parcels | 85529 |
| Number of parcels with circulation (=1) | 58187 |
| Number of parcels with circulation (>1) | 27342 |
| Average number of circulations | 1.726677501198424 |
| Total number of parcels completed sorting | 85415 |
| Average sorting time (in minutes) | 2.582696247731663 |
| Minimum sorting time (in minutes) | 0 |
| Maximum sorting time (in minutes) | 10 |

TABLE 8

Average sorting time after replacing the more utilized chute with less utilized chute.

| KPI's | Values |
|---|---|
| Total number of parcels | 85529 |
| Number of parcels with circulation (=1) | 58535 |
| Number of parcels with circulation (>1) | 26994 |
| Average number of circulations | 1.7167393515649663 |
| Total number of parcels completed sorting | 85405 |
| Average sorting time (in minutes) | 2.3967917569228967 |
| Minimum sorting time (in minutes) | 0 |
| Maximum sorting time (in minutes) | 10 |

TABLE 9

Average sorting time and the average number of circulations when the re-circulation count (a system parameter) is increased.

| KPI's | Values |
|---|---|
| Total number of parcels | 83485 |
| Number of parcels with circulation (=1) | 55734 |
| Number of parcels with circulation (>1) | 27751 |
| Average number of circulations | 2.1319997604360066 |
| Total number of parcels completed sorting | 83177 |
| Average sorting time (in minutes) | 3.7475504045589525 |
| Minimum sorting time (in minutes) | 0 |
| Maximum sorting time (in minutes) | 16 |

The table 9 depicts a use case illustrating the effect of change in a circulation count when the re-circulation count is increased from 3 to 5. Referring to the table 7 and table 9, it is observed that there is a significant change in the average sorting time and the average number of circulations after the circulation count is increased from 3 to 5.

Figure 4:
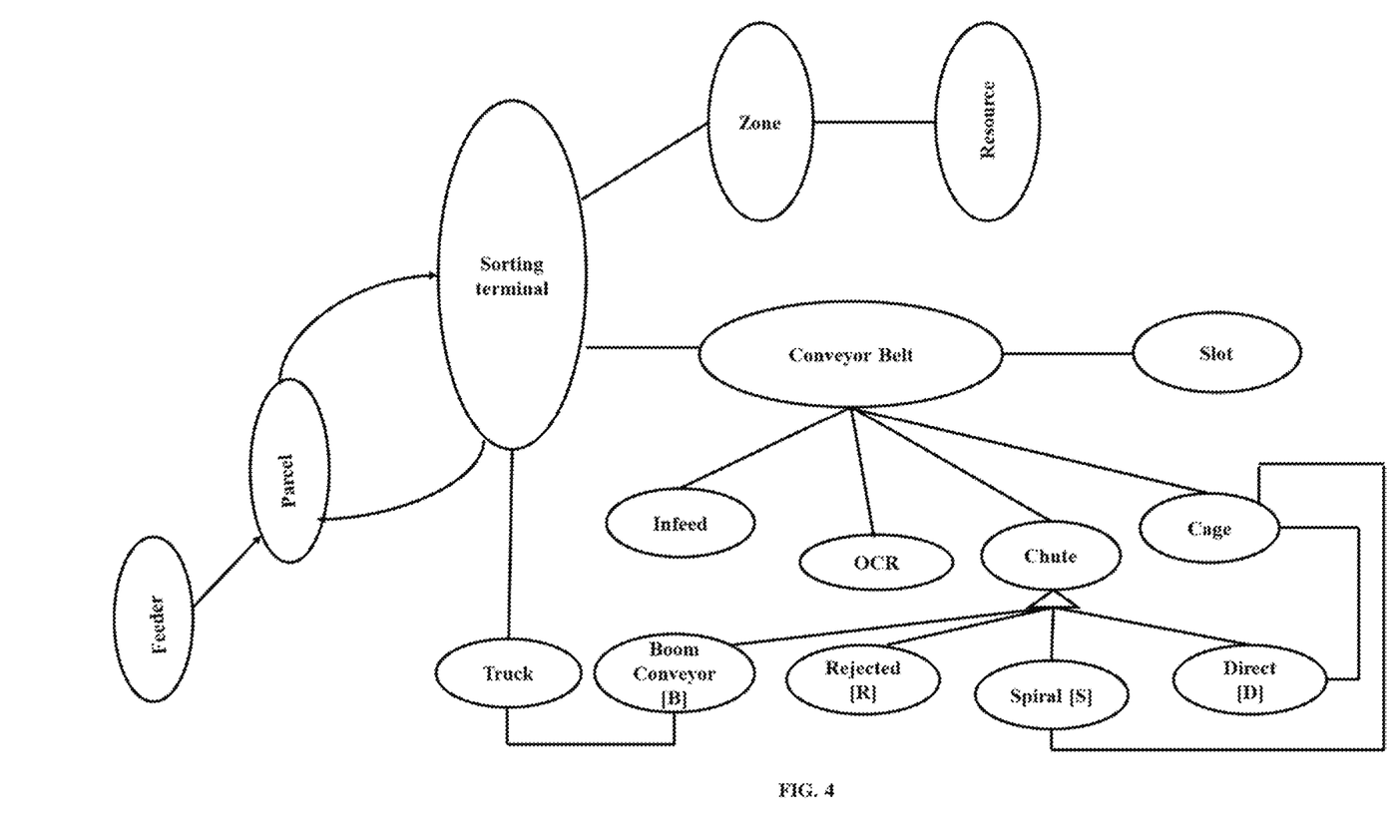
FIG. 4 illustrates a use case example of dynamically optimizing the operations of the logistics management system, according to an embodiment of the present disclosure.

FIG. 4 illustrates a use case example of dynamically optimizing the operations of the logistics management system, according to an embodiment of the present disclosure. FIG. 4 shows an illustrative actor topology with set of actors (i.e., entities 114 and 130 of FIG. 2) and their interactions. Referring to FIG. 4, the sorting terminal statically includes one or more conveyor belts. Each conveyor belt comprises one or more slots, wherein each slot can hold a parcel at a specific time. In a typical setting of the sorting terminal, the in-feeds, the OCRs (Optical Character Reader), the chutes and the cages are placed on each conveyor belt. The infeed introduces the one or more parcels into the conveyor belt, wherein the OCRs (Optical Character Reader) of the sorting terminal scans the data related to the one or more parcels to decide a destination chute, and the chutes collects the one or more parcels. Typically, the chutes are of four types which includes—
   (i) a boom conveyor chute for large parcels which directly connects with an outgoing truck for a specific time duration so that the parcel can be conveniently loaded into a destination truck.
   (ii) a spiral chute for medium size parcels where each spiral chute is connected with multiple cages for the one or more parcels movements from the chute to the cage to the truck.
   (iii) a direct chute for small parcels and
   (iv) a rejection chute for unsorted parcels.
The sorting terminal is typically divided into multiple zones wherein each zone may have a set of staffs to load the one or more parcels from the chute to the cage, and transfer cages from the sorting terminal to the destination trucks. The proposed sorting terminal digital twin considers a feeder (shown in FIG. 4) to introduce digital version of the parcels (virtual parcels) into the infeed to enable various what-if scenario which are depicted from table 1 to table 9.

Figure 5A:
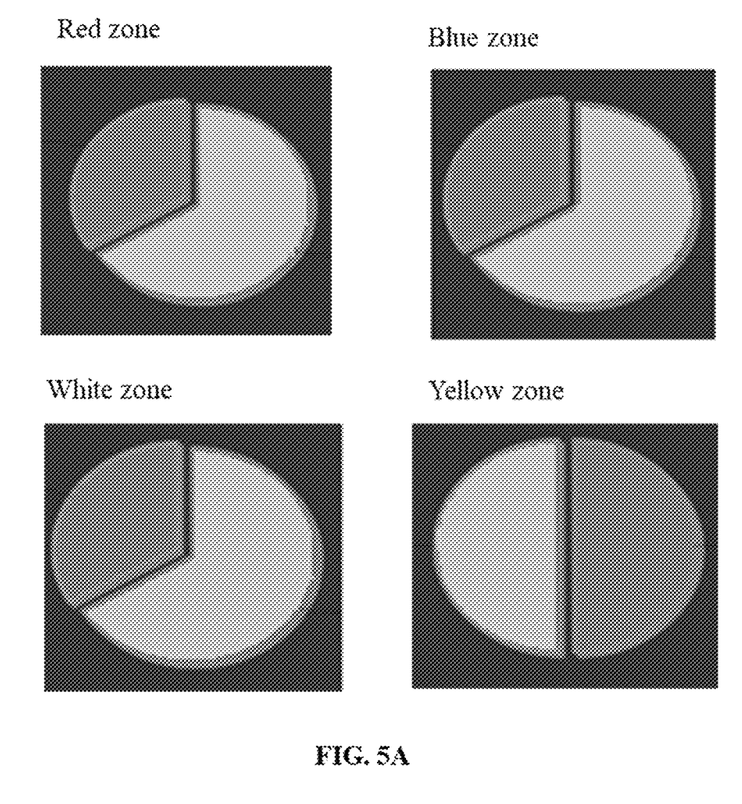
FIGS. 5A and 5B illustrates a use case example of a resource allocation involved in dynamically optimizing the operations of the logistics management system, according to an embodiment of the present disclosure.
Figure 5B:
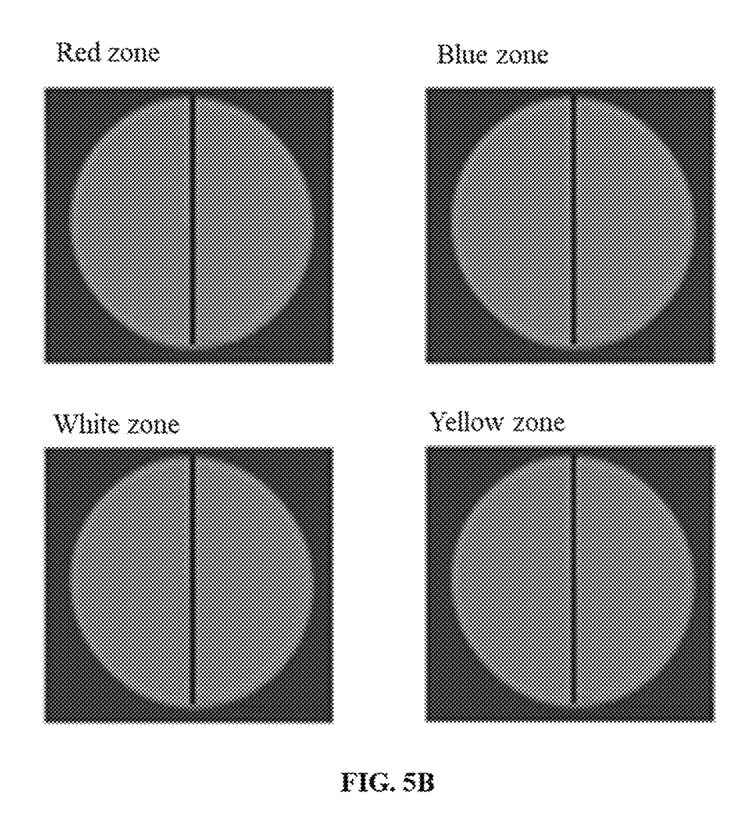

FIGS. 5A and 5B illustrates a use case example of a resource allocation involved in dynamically optimizing the operations of the logistics management system, according to an embodiment of the present disclosure. For the purpose of illustration, 4 zones which includes red zone, blue zone, white zone and yellow zone are considered. Referring to the FIG. 5B, it can be observed that there is an improvement in the resource utilization when the resource count is reduced i.e., the zone wise distribution is reduced from [3, 3, 3 4] to [2, 2, 2, 3] respectively.

Hence, a method and a system for dynamically optimizing the operations of the logistics management system is provided. The proposed method and system for the optimization of processes in the logistics management system explain the use of the multi-modelling based simulatable digital twin for in-silico quantitative exploration of control, adaptation and transformation alternatives of the sorting terminals to help business experts to arrive at the right interventions at right time and with right sequence with precision.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:
1. A processor-implemented method for dynamically optimizing operations of a logistics management system, the processor-implemented method comprising:
   receiving, via one or more hardware processors, a plurality of data computed based on:
   historical data related to one or more parcels, data related to one or more sorting terminals, the one or more sorting terminals being a cyber physical system comprising of automated in feeds, data related to one or more staff, and a plurality of parameters related to the one or more parcels from distributed sources with heterogeneous technology platforms, wherein the one or more parcels, the one or more sorting terminals, the one or more staff and the plurality of parameters are associated with the logistics management system, wherein the heterogeneous technology platforms includes a database, a machine learning agent, a reinforcement learning agent, and an optimizer, and wherein the plurality of parameters is derived from the reinforcement learning agent which learns continuously from the historical data and real data of configured entities, wherein the reinforcement learning agent further comprises characteristics and the real time data related to the staff and a sorting logic, and wherein the plurality of parameters includes a recirculation count, a number of chutes and corresponding location of the chutes;

forecasting, via the one or more hardware processors, the plurality of data related to the one or more parcels based on the received plurality of data;

configuring the plurality of forecasted data related to the one or more parcels as a first set of entities;

configuring, via the one or more hardware processors, each of the one or more sorting terminals as a second set of entities;

configuring, via the one or more hardware processors, the data related to the one or more staff as a third set of entities;

constructing, via the one or more hardware processors, a digital twin of the logistics management system using the second set of entities, the third set of entities and the plurality of parameters, wherein a sorting terminal digital twin, a human resources digital twin along with the plurality of parameters derived from the reinforcement learning agent of the logistics management system assist to construct the digital twin of the logistics management system;

providing, via the one or more hardware processors, a real time data related to the configured first, second and the third set of entities, as input to the constructed digital twin of the logistics management system to record a behavior of the configured first, second and the third set of entities;

simulating, via the one or more hardware processors, the behavior of the configured first, second and the third set of entities for a plurality of scenarios;

comparing, via the one or more hardware processors, the simulated behavior and the recorded behavior of the configured first, second and the third set of entities in terms of a set of key performance indicators;

providing, via the one or more hardware processors, a set of requirements to the logistics management system based on the comparison to optimize the operations of the one or more sorting terminals;

developing an actor-based language to specify the digital twin of the logistics management system wherein the one or more parcels, the one or more sorting terminals, the one or more staff, and the reinforcement learning agent are represented as an actor, wherein the actor-based language captures the logistics management system as a set of intentional autonomous composable actors, wherein the one or more parcels as the actor achieves stated goal by responding to events of interest and by exchanging messages with other actors including the one or more sorting terminals and the one or more staff, and wherein the actor behavior is stochastic; and providing, via the one or more hardware processors, a hi-fidelity representation of the one or more sorting terminals in terms of the digital twin, wherein the digital twin is validated for correctness using past data, and wherein the digital twin of the one or more sorting terminals identifies a desired set of localized interventions related to the plurality of scenarios for one or more exception situations, the desired set of localized interventions being identified from a set of interventions using reinforcement learning technique, wherein the reinforcement learning agent imparts continual dynamic adaptiveness to the one or more sorting terminals, wherein the learning is obtained in silico using the hi-fidelity representation of the one or more sorting terminals and the real time data, wherein the digital twin provides in-silico quantitative exploration of control, adaptation and transformation alternatives of the one or more sorting terminals to arrive at the interventions, wherein controlling the one or more sorting terminals by applying appropriate intervention in response to a change in environment, and design appropriate sorting terminal configuration that meets operational needs of the one or more sorting terminals, wherein the operations of the logistics management system are dynamically optimized by reducing average sorting time by replacing location of more utilized chute with less utilized chute placed near one or more scanners.

2. The method of claim 1, wherein the plurality of historical data related to one or more parcel includes the parcel characteristics data, wherein the parcel characteristics data further includes size, weight, and destination of the one or more parcels and, wherein the data related to the one or more sorting terminals includes a number of conveyor belts, a number of in-feeds, a number of out-feeds, a number of slots in the conveyor belts and a number of chutes.

3. The method of claim 1, wherein the data related to the one or more staff includes staff characteristics, staff productivity and staff availability.

4. The method of claim 1, wherein the step of providing the real time data to the constructed digital twin of the logistics management system further includes providing data related to the staff and the sorting logic.

5. The method of claim 1, wherein the set of key performance indicators includes utilization of the staff, turn-around time of the one or more parcels and capacity which is represented in terms of one or more parcels serviced, wherein the turn-around time represents time period taken by the parcels during in-feed and out-feed.

6. The method of claim 1, wherein the plurality of scenarios comprises one or more of:
a scenario specific to a change in the behavior of the configured entities;
a scenario wherein the quantity of parcels serviced is more compared to the normal parcel processing;
a scenario specific to a change/variation in the staff; and
a scenario specific to a change in the chute availability and working.

7. The method of claim 1, wherein the set of requirements for the logistics management system includes increasing throughput, increasing staff utilization, increasing utilization of all configured entities which are related to the one or more sorting terminal.

8. A system for dynamically optimizing operations of a logistics management system, the system comprising:
the logistics management system;
a memory storing instructions;
one or more communication interfaces;
one or more hardware processors coupled to the memory via the one or more communication interfaces, wherein the one or more hardware processors are configured by the instructions to:
receive a plurality of data computed based on:
historical data related to one or more parcels,
data related to one or more sorting terminals, the one or more sorting terminals being a cyber physical system comprising of automated in feeds,
data related to one or more staff, and a plurality of parameters related to the one or more parcels from distributed sources with heterogeneous technology platforms, wherein the one or more parcels, the one or more sorting terminals, the one or more staff and the plurality of parameters are associated with the logistics management system, wherein the heterogeneous technology platforms includes a database, a machine learning agent, a reinforcement learning agent, and an optimizer, and wherein the plurality of parameters is derived from the reinforcement learning agent which learns continuously from the historical data and real data of the configured entities, wherein the reinforcement learning agent further comprises characteristics and the real time data related to the staff and a sorting logic and, wherein the plurality of parameters includes a recirculation count, a number of chutes and the corresponding location of the chutes;
forecast the plurality of data related to the one or more parcels based on the received plurality of data;
configure the plurality of forecasted data related to the one or more parcels as a first set of entities;
configure each of the one or more sorting terminals as a second set of entities;
configure the data related to the one or more staff as a third set of entities;
construct a digital twin of the logistics management system using the second set of entities, the third set of entities and the plurality of parameters, wherein a sorting terminal digital twin, a human resources digital twin along with the plurality of parameters derived from the reinforcement learning agent of the logistics management system assist to construct the digital twin of the logistics management system;
provide a real time data related to the configured first, second and the third set of entities, as input to the constructed digital twin of the logistics management system to record a behavior of the configured first, second and the third set of entities;
simulate the behavior of the configured first, second and the third set of entities for a plurality of scenarios;
compare the simulated behavior and the recorded behavior of the configured first, second and the third set of entities in terms of a set of key performance indicators;
provide a set of requirements to the logistics management system based on the comparison to optimize the operations of the one or more sorting terminals;
develop an actor-based language to specify the digital twin of the logistics management system wherein the one or more parcels, the one or more sorting terminals, the one or more staff, and the reinforcement learning agent are represented as an actor, wherein the actor-based language captures the logistics management system as a set of intentional autonomous composable actors, wherein the one or more parcels as the actor achieves stated goal by responding to events of interest and by exchanging messages with other actors including the one or more sorting terminals and the one or more staff, and wherein the actor behavior is stochastic; and
provide a hi-fidelity representation of the one or more sorting terminals in terms of the digital twin, wherein the digital twin is validated for correctness using past data, and wherein the digital twin of the one or more sorting terminals identifies a desired set of localized interventions related to the plurality of scenarios for one or more exception situations, the desired set of localized interventions being identified from a set of interventions using reinforcement learning technique,
wherein the reinforcement learning agent imparts continual dynamic adaptiveness to the one or more sorting terminals, wherein the learning is obtained in silico using the hi-fidelity representation of the one or more sorting terminals and the real time data,
wherein the digital twin provides in-silico quantitative exploration of control, adaptation and transformation alternatives of the one or more sorting terminals to arrive at the interventions, wherein controlling the one or more sorting terminals by applying appropriate intervention in response to a change in environment, and design appropriate sorting terminal configuration that meets operational needs of the one or more sorting terminals,
wherein the operations of the logistics management system are dynamically optimized by reducing average sorting time by replacing location of more utilized chute with less utilized chute placed near one or more scanners.

9. The system as claimed in claim 8, wherein the plurality of historical data related to one or more parcel includes the parcel characteristics data.

10. The system) as claimed in claim 8, wherein the data related to one or more sorting terminals includes a number of conveyor belts, a number of in-feeds, a number of out-feeds, a number of slots in the conveyor belts and a number of chutes and, wherein the data related to one or more digital representation of staff includes staff characteristics, staff productivity and staff availability.

11. The system as claimed in claim 8, wherein the step of providing the real time data to the constructed digital twin of the logistics management system further includes providing data related to the staff and the sorting logic.

12. The system as claimed in claim 8, wherein the set of key performance indicators includes utilization of the staff, turn-around time of the one or more parcels and capacity which is represented in terms of one or more parcels serviced, wherein the turn-around time represents time period taken by the parcels during in-feed and out-feed.

13. The system as claimed in claim 8, wherein the one or more hardware processors are further configured by the instructions to comprise one or more of:
a scenario specific to a change in the behavior of the configured entities;

a scenario wherein the quantity of parcels serviced is more compared to the normal parcel processing;

a scenario specific to a change/variation in the staff availability; and a scenario specific to a change in the chute availability and working.

14. The system as claimed in claim 8, wherein the set of requirements for the logistics management system includes increasing throughput, increasing staff utilization, increasing utilization of all configured entities which are related to the one or more sorting terminal.

15. One or more non-transitory machine-readable information storage mediums comprising one or more instructions which when executed by one or more hardware processors cause:

receiving a plurality of data computed based on:

historical data related to one or more parcels, data related to one or more sorting terminals, the one or more sorting terminals being a cyber physical system comprising of automated in feeds, data related to one or more staff, and a plurality of parameters related to the one or more parcels from distributed sources with heterogeneous technology platforms, wherein the one or more parcels, the one or more sorting terminals, the one or more staff and the plurality of parameters are associated with the logistics management system, wherein the heterogeneous technology platforms includes a database, a machine learning agent, a reinforcement learning agent, and an optimizer, and wherein the plurality of parameters is derived from the reinforcement learning agent which learns continuously from the historical data and real data of the configured entities, wherein the reinforcement learning agent further comprises characteristics and the real time data related to the staff and a sorting logic and, wherein the plurality of parameters includes a recirculation count, a number of chutes and the corresponding location of the chutes;

forecasting the plurality of data related to the one or more parcels based on the received plurality of data;

configuring the plurality of forecasted data related to the one or more parcels as a first set of entities;

configuring each of the one or more sorting terminals as a second set of entities;

configuring the data related to the one or more staff as a third set of entities;

constructing a digital twin of the logistics management system using the second set of entities, the third set of entities and the plurality of parameters, wherein a sorting terminal digital twin, a human resources digital twin along with the plurality of parameters derived from the reinforcement learning agent of the logistics management system assist to construct the digital twin of the logistics management system;

providing a real time data related to the configured first, second and the third set of entities, as input to the constructed digital twin of the logistics management system to record a behavior of the configured first, second and the third set of entities;

simulating the behavior of the configured first, second and the third set of entities for a plurality of scenarios;

comparing the simulated behavior and the recorded behavior of the configured first, second and the third set of entities in terms of a set of key performance indicators;

providing a set of requirements to the logistics management system based on the comparison to optimize the operations of the one or more sorting terminals;

developing an actor-based language to specify the digital twin of the logistics management system wherein the one or more parcels, the one or more sorting terminals, the one or more staff, and the reinforcement learning agent are represented as an actor, wherein the actor-based language captures the logistics management system as a set of intentional autonomous composable actors, wherein the one or more parcels as the actor achieves stated goal by responding to events of interest and by exchanging messages with other actors including the one or more sorting terminals and the one or more staff, and wherein the actor behavior is stochastic; and providing a representation of the one or more sorting terminals in terms of the digital twin, wherein the digital twin is validated for correctness using past data, and wherein the digital twin of the one or more sorting terminals identifies a desired set of localized interventions related to the plurality of scenarios for one or more exception situations, the desired set of localized interventions being identified from a set of interventions using reinforcement learning technique, wherein the reinforcement learning agent imparts continual dynamic adaptiveness to the one or more sorting terminals, wherein the learning is obtained in silico using the hi-fidelity representation of the one or more sorting terminals and the real time data, wherein the digital twin provides in-silico quantitative exploration of control, adaptation and transformation alternatives of the one or more sorting terminals to arrive at the interventions, wherein controlling the one or more sorting terminals by applying appropriate intervention in response to a change in environment, and design appropriate sorting terminal configuration that meets operational needs of the one or more sorting terminals, wherein the operations of the logistics management system are dynamically optimized by reducing average sorting time by replacing location of more utilized chute with less utilized chute placed near one or more scanners.

16. The one or more non-transitory machine readable information storage mediums of claim 15, wherein the plurality of historical data related to one or more parcel includes the parcel characteristics data.

* * * * *